United States Patent
Snell

[11] 3,708,196
[45] Jan. 2, 1973

[54] PIPE HOOKS

[76] Inventor: James H. Snell, Route 4, Kalispell, Mont. 59901

[22] Filed: Nov. 12, 1970

[21] Appl. No.: 88,566

[52] U.S. Cl. .................................. 294/26, 294/92
[51] Int. Cl. .................................. B65g 7/12
[58] Field of Search ................... 294/26, 27, 92, 17

[56] References Cited

UNITED STATES PATENTS

| 3,014,749 | 12/1961 | Carrow | 294/26 |
| 1,003,874 | 9/1911 | Casper | 294/92 X |
| 2,806,731 | 9/1957 | Comstock | 294/27 |
| 3,574,380 | 4/1971 | Tague | 294/16 |

*Primary Examiner*—Evon C. Blunk
*Assistant Examiner*—Johnny D. Cherry
*Attorney*—Hofgren, Wegner, Allen, Stellman & McCord

[57] ABSTRACT

A hand-tool for carrying a section of irrigation pipe which includes a pair of hooks held at spaced points along the pipe section for supporting the pipe. Each hook has a portion in which the pipe is loosely received. When the hooks are canted with respect to the pipe, the receiving portion of each hook grips the pipe and holds it against rotation about its longitudinal axis.

A method of carrying a length of pipe, including the steps of placing a pair of hooks about a pipe section, holding the pipe against rotation about its longitudinal axis and lifting the pipe while continuously holding the same.

1 Claim, 4 Drawing Figures

PATENTED JAN 2 1973

3,708,196

Inventor:
James H. Snell
By Hofgren, Wegner,
Allen, Stellman & M<sup>c</sup>Cord
Attys 3,708,196

PIPE HOOKS

BACKGROUND OF THE INVENTION

1. Field of the Invention

This invention relates to a hand-tool and method for carrying a section of pipe. More particularly, this invention relates to a pipe carrying hand-tool which prevents a carried section of pipe from rotating about its longitudinal axis and the method of using the same.

2. Description of the Prior Art

There are many situations in the field where it is desirable to move an irrigation pipe section from one location to another. Very often, the size and weight of the pipe and the distance which it is to be moved to is such that one man is able to do it without heavy equipment.

Frequently, there is a riser extending perpendicularly from the pipe section having a sprinkler head at the end thereof. If the pipe section is allowed to rotate about its longitudinal axis while being carried, the sprinkler head will hit the ground damaging the head and riser.

To the best of my knowledge, carrying tools have never been used to permit one man to move irrigation pipe sections. Carrying tools which are available for such use have moving parts and are relatively expensive. See for example U. S. Pat. No. 2,819,111.

SUMMARY OF THE INVENTION

The principal object of this invention is to provide a simple hand-tool for carrying a section of pipe whereby the pipe is held against rotation about its longitudinal axis and a method of using the same. Accordingly, there is provided a pair of hooks spaced along a pipe section for supporting the pipe at two points therealong. Each hook has a portion in which the pipe is loosely received. The pipe is held against rotation about its longitudinal axis when each hook is canted with respect to the pipe.

In an exemplary embodiment of the invention, the pipe receiving portion is U-shaped and has a bight portion joining two leg portions which extend therefrom. The leg portions include a lower leg portion which underlies a pipe upon which the pipe rests by gravity and an upper leg portion which overlies the pipe. The leg portions are spaced apart a distance greater than the diameter of the pipe. When the hooks are canted with respect to the pipe, the leg portions engage the sides of the pipe thereby holding the pipe against rotation about its longitudinal axis. The hook also includes a handle portion connected to the pipe receiving portion. A connection portion extending from the upper leg portion connects the handle portion to the pipe receiving portion.

A section of pipe is carried by the pipe hooks by first, placing the hooks about the pipe at points spaced along the length thereof; second, holding the pipe against rotation along its longitudinal axis by canting the hooks so that the leg portions engage opposite sides of the pipe; and third, lifting the hooks and the pipe therein while continuously holding the pipe.

DESCRIPTION OF THE PREFERRED EMBODIMENT

Figure 1:
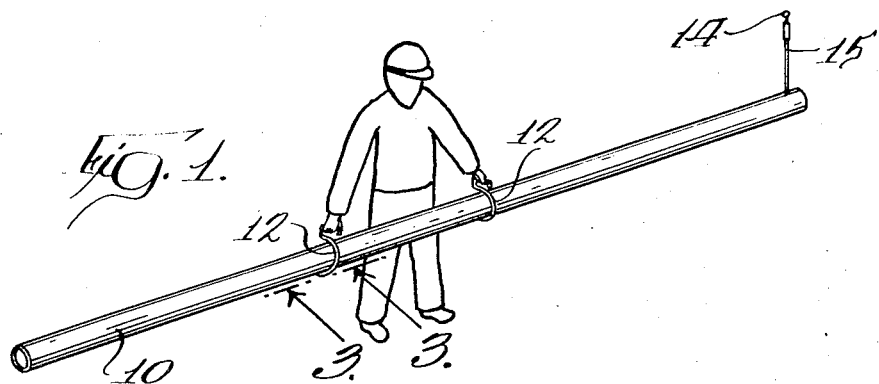
FIG. 1 is a diagrammatic view of a man carrying a section of pipe employing the present invention.

Turning now to FIG. 1, there is shown a section of pipe 10 carried by a man employing a pair of identical hooks, generally designated 12, which are spaced along the pipe section 10. The hooks 12 support the pipe 10 at two points therealong.

Irrigation pipe sections are normally either 3 or 4 inch lateral pipe, although they might, in some circumstances, be of 6 or 8 inch diameter. The standard length of each pipe section is 40 feet. The weight of a standard length of pipe section according to its diameter is approximately as follows: 3 inch pipe — 30 pounds; 4 inch pipe — 40 pounds; 6 inch pipe — 50 pounds; and 8 inch pipe — 70 pounds.

At one end of the pipe section 10 there is a sprinkler head 14 at the end of a riser 15 extending perpendicularly from the pipe 10. The riser 15 is normally 1 inch in diameter and 12 inches in length, although an 18 inch riser is used on some occasions. The approximate weight of the sprinkler head 14 and a 1 foot riser 15 is 1 pound. The riser 15 is constructed of fairly light material. Consequently, if the pipe 10, which is usually wet and slippery, should rotate in the hands of a person moving it, causing the sprinkler head 14 to strike the ground, the riser 15 is often damaged. The hooks 12 support the pipe 10 and restrain it against rotation about its longitudinal axis so that they prevent this from occurring.

Figure 2:
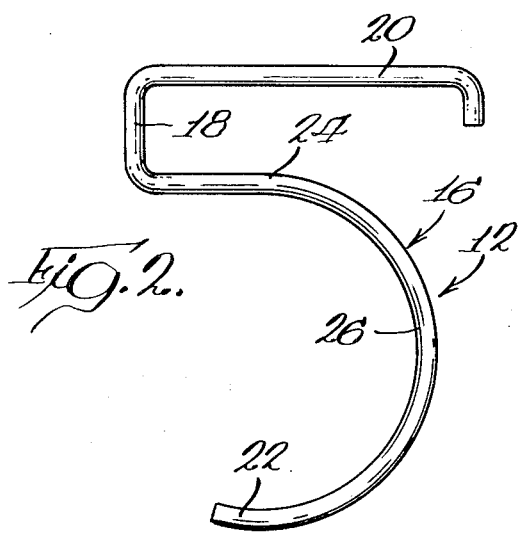
FIG. 2 is a side view of a pipe hook.

As best seen in FIG. 2, each hook 12 has a semicircular portion, generally designated 16, in which the pipe 10 is received (FIGS. 3 and 4), a connecting portion 18 extending from the receiving portion 16 and a handle portion 20 extending generally at right angles from the connecting portion 18. The diameter of the semi-circular receiving portion 16 is somewhat greater than the diameter of the pipe 10 so that the pipe is initially received loosely in the receiving portion 16.

Each hook 12 is planar and is formed from a length of metal rod as by bending. Although the receiving portion 16 is shown in the drawings as being semi-circular, any configuration which is generally U-shaped can be employed to practice this invention. For convenience of discussion, the receiving portion is defined as including a pair of spaced legs 22 and 24 joined by a bight 26.

Figure 3:
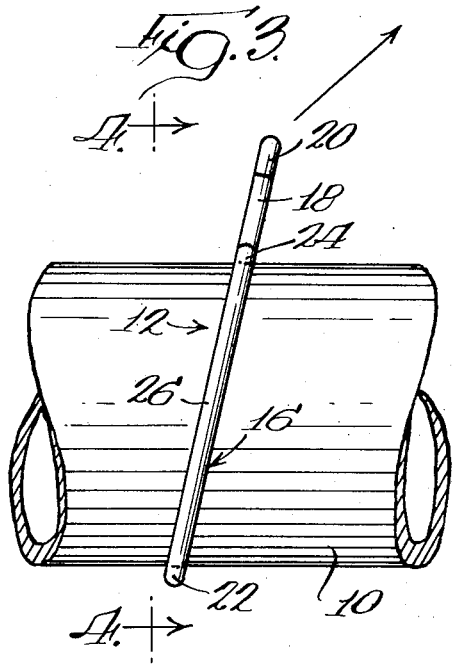
FIG. 3 is an edge view taken generally along the line 3—3 of FIG. 1.
Figure 4:
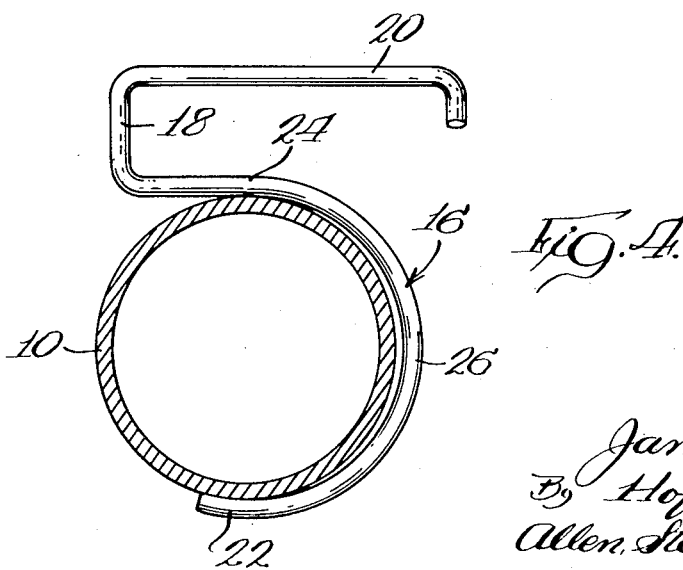
FIG. 4 is a side view taken generally along the line 4—4 of FIG. 1.

As shown in FIGS. 3 and 4, the pipe 10 rests by gravity upon leg 22 which underlies the pipe. Leg 24 is seen to overlie the pipe when the pipe is received in the receiving portion 16. As was stated previously, the legs 22 and 24 are spaced apart a distance greater than the diameter of the pipe 10. For a 4 inch pipe section, the diameter of each hook 12 is approximately 4 ¼ inches.

When the hooks 12 are canted with respect to the pipe 10, legs 22 and 24 engage the sides of the pipe as shown in FIGS. 3 and 4. The engagement of the legs 22 and 24 with the sides of the pipe 10 not only supports the pipe so that it may be lifted off the ground, but also holds the pipe against rotation about its longitudinal axis. When carried in this position, a pipe may be transported from one location to another in the field without rotation which might damage the riser 15.

The angular extent of the arc of the receiving portion 16 is somewhat greater than 180° so that the ends of the legs 22 and 24 extend beyond the points of contact between the legs and the top and bottom of pipe 10. Handle portion 20 is located with re-spect to the semicircular pipe receiving portion 16 and the end of leg 22 so that the end of the leg extends beyond a line drawn through the center of the arcuate portion and generally at right angles to the handle portion.

In use, the hooks 12 are placed around a pipe 10 while on the ground making sure that the riser 15 is not hanging down. The hooks 12 should be located a distance far enough from each other so the pipe 10 can be conveniently carried. When the riser 15 is in a safe position, the handles 20 of the hooks 12 are grasped. The handles 20 are pulled toward the user thereby canting the hooks 12 with respect to the pipe 10. When the hooks 12 are canted, the pipe 10 is simultaneously gripped and held against any rotation about its longitudinal axis. After the hooks 12 have been canted, the pipe 10 is lifted off the ground and carried in the manner shown in FIG. 1. In this position, the hooks 12 form extensions onto the arms of the user.

I claim:

1. A pair of hooks for carrying a length of pipe in a generally horizontal attitude, each hook comprising:

an elongate member having a generally planar and generally arcuate segment with an angular extent greater than 180° forming a U-shaped portion with a pair of spaced legs joined by a bight, said legs being spaced apart a distance greater than the diameter of said pipe to embrace the pipe and engage opposite sides thereof when said member is canted with respect to said pipe, said member having a connecting portion extending from one of said legs in the plane of said U-shaped portion and in a direction generally at right angles to the leg, said member further having an elongate handle portion extending from said connecting portion generally parallel to said legs and in the plane of said U-shaped portion, the other of said spaced legs having its end extending beyond a line drawn perpendicular to the elongate handle portion and passing through the center of said generally arcuate segment, said length of pipe being supported and held against rotation by said pair of hooks spaced along the length of the pipe and having the handle portions uppermost and canted toward each other.

* * * * *